United States Patent Office 2,755,323
Patented July 17, 1956

2,755,323

ALUMINA-METAL OXIDE DEHYDROGENATION CATALYST AND ITS PREPARATION

Emory W. Pitzer, Bartlesville, Okla., assignor to Phillips Petroleum Company, a corporation of Delaware No Drawing. Application March 30, 1953,
Serial No. 345,711

16 Claims. (Cl. 260—683.3)

This invention pertains to an improved dehydrogenation-hydrogenation catalyst and to its method of manufacture. This invention also relates to conversion processes which involve the changing of the carbon-to-hydrogen ratio in organic compounds. A specific aspect of the invention is concerned with the dehydrogenation of $C_2$–$C_{10}$ hydrocarbons.

Various organic compounds, particularly those hydrocarbons containing at least two or not more than ten carbon atoms per molecule, must frequently be dehydrogenated to produce more unsaturated materials suitable for various purposes in the chemical and petroleum industries. Such reactions include dehydrogenation of butane to produce butylenes, dehydrogenation of butylenes to produce butadiene, dehydrogenation of other paraffins to produce the corresponding olefins, dehydrogenation of olefins to produce the corresponding diolefins, dehydrogenation of naphthenes to produce aromatics, dehydrogenation of heterocyclic compounds to produce less saturated heterocyclic compounds, and dehydrocyclization of aliphatic hydrocarbons to produce aromatic hydrocarbons. Conversely, it is frequently desirable to effect hydrogenation of unsaturated material to produce more saturated products, for example, hydrogenation of aromatic hydrocarbons to produce cyclo-aliphatic hydrocarbons, and hydrogenation of petroleum fractions containing olefinic materials to effect saturation thereof.

As catalysts for such reactions, refractory metal oxides and mixtures thereof, in various forms, have been used. Various procedures for the preparation of the catalysts have also been employed, including coprecipitation of concentrated sols to produce gel catalysts, mechanical mixing of components of composite catalysts, and deposition of active catalytic material on non-catalytic material or less-active catalytic material. A particularly effective catalyst for these reactions has been found to be one containing a mixture of the oxides of chromium and aluminum. For example, a particularly effective catalytic composition for dehydrogenating paraffin hydrocarbons is found in a 2-component catalyst consisting of about 40 per cent chromia and 60 per cent alumina. Other proportions of these constituents are also effective in dehydrogenation processes. A conventional method for preparing such composites is the impregnation of a substantially dehydrated alumina pellet with salt solutions of the other metals followed by the conversion of the metal salts to the metal oxides. Another effective dehydrogenation catalyst has been made by coprecipitating the metal hydroxides from solutions of their salts, and heating, so as to obtain a composite gel consisting of the metal oxides in intimate contact in a homogeneous gel. Various other methods of preparing dehydrogenation catalysts have been devised. While the coprecipitated gel catalysts are effective dehydrogenation catalysts, they are comparatively expensive because of the complicated and time-consuming methods required in their preparation.

The present invention encompasses the use of the catalysts described herein in processes for adding hydrogen to, or taking hydrogen from, organic compounds, preferably hydrocarbons. They are particularly effective in dehydrogenating normal butane to normal butenes, cyclohexane to benzene, ethyl benzene to styrene, methylethylpyridine to methylvinylpyridine, and analogous reactions involving homologs of these materials. These catalysts may be used to advantage in the dehydrogenation of any dehydrogenatable hydrocarbon, under conditions of temperature, pressure, and reaction time within conventional ranges such as 900 to 1300° F., up to 500 p. s. i. g., and 0.5 to 5 liquid volumes of charge per volume of catalyst per hour, and are especially advantageous when treating organic compounds having at least 2 and not more than 10 carbon atoms per molecule.

It is an object of the present invention to provide an improved method for dehydrogenating organic compounds. It is also an object of this invention to provide improved dehydrogenation catalysts. It is a further object of this invention to provide a method for the manufacture of a dehydrogenation-hydrogenation catalyst which has improved activity and reduced coke deposition in comparison to other catalysts of the same composition. A further object of the invention is to provide an improved process for dehydrogenating hydrocarbons, particularly paraffin hydrocarbons, including the dehydrogenation of n-butane to butylenes and butadiene. Other objects of the invention will become apparent from a consideration of the accompanying disclosure.

I have now discovered an improved method for manufacturing chromia-containing hydrogenation-dehydrogenation catalysts. These catalysts have high activity and are longevous in the hydrogenation and dehydrogenation of hydrocarbons. In the dehydrogenation of n-butane, a catalyst prepared by my invention has improved activity and reduced coke deposition, on a weight basis, in comparison to other catalysts known to the art and of the same composition. Advantages of a catalyst manufactured by the method of my invention comprise the ease of handling phenol, recoverability of phenol, and the low apparent density of the composite. The method of my invention entails digesting a mixture of the raw materials for the catalyst in powdered or finely comminuted form in phenol, followed by heating the digested mixture to remove the phenol, and thereafter comminuting the digested and dried mixture. The resulting powdered composite may be utilized as such, in "fluidized" catalyst processes, or it may be formed into pellets by conventional tableting or pelleting techniques involving compacting of the powdered material with a combustible organic binder, such as "Sterotex" (hydrogenated corn oil), and firing the pellets so as to burn out the binder and harden the pellets. Other conventional methods of forming catalytic shapes, such as granulation and extrusion may be used.

In one embodiment of the method of my invention chromium trioxide and hydrated aluminum oxide are admixed with at least sufficient phenol to thoroughly wet the mixed oxides. Usually a quantity of phenol of about 2 or 3 times the weight of the mixed oxides is suitable, but a weight of phenol between 0.5 and 5 times the weight of the mixed oxides will produce satisfactory results. The mixed oxides are digested in the phenol either under total reflux or by periodically adding phenol to the digesting mixture to insure suitable amounts of phenol at all times. The digestion with phenol should be continued for a period of at least 7 hours, but usually a period of 40 to 60 hours and sometimes a period of 100 hours or more is used. After digestion, the phenol is removed by evaporation and the residue is heated for at least 3 hours, but usually 10 to 25 hours, at a temperature in the range of 600 to 800° F., preferably 750° F., to remove the remaining phenol and expel all the liquid from the mixture. The mixture is then ground to pass, for example, a 50-mesh screen and Sterotex, in an amount equal in weight to 10 per cent of the catalyst, is admixed with the finely divided catalytic material as a binder-lubricant in the pilling operation. After pilling, the Sterotex is removed by heating the pills in air to a temperature of about 1000° F. in 3 hours and maintaining that temperature for a period of about 20 hours. In the preparation of a chromia-alumina catalyst by the method of my invention, suitable dehydrogenation catalysts can be prepared with any reasonable proportions of these constituents, but an amount of chromia, as chromic oxide ($Cr_2O_3$), in the range of 10 to 60 per cent by weight of the final catalyst is preferred in that such catalysts are more effective in the dehydrogenation reactions.

The catalyst prepared by my method may be used in the dehydrogenation of any dehydrogenatable organic compound; hydrocarbons may be dehydrogenated under conditions of temperature, pressure, and reaction time within conventional ranges, such as 900 to 1300° F., at pressures ranging from atmospheric pressure up to 500 pounds per square inch, and a gaseous space velocity ranging from 100 to 5000. When the catalyst becomes inactive due to the deposition of coke the catalyst may be regenerated by burning off the deposited coke in an oxygen-containing atmosphere. When air is used for this purpose, a temperature in the range of 900 to 1300° F. and a gaseous space velocity of 500 to 5000 volumes of air per volume of catalyst per hour is used.

As was stated above, preparation of an alumina-chromina composite by the method of my invention, wherein the amount of chromium oxide is in the range of from 10 to 60 per cent by weight of the final composite, is preferred. However, even in compositions outside of the preferred range, the method of my invention produces excellent catalysts. Although the catalyst has been described herein as including only chromia and alumina it is to be understood that the composite can be formed of similar proportions of oxides of other Group 6 metals, such as Mo, W, U and/or V of Group 5, with alumina as the carrier. Furthermore, I can use either chromic oxide ($Cr_2O_3$) or chromium trioxide ($CrO_3$) as a starting material and the scope of my invention includes more than one of these metal oxides, in a total amount between 10 and 60 per cent by weight of the finished catalyst combined with alumina. Although I have recited only alumina as the catalyst support, the usual catalyst supports, such as silica-alumina, bauxite or other natural forms of alumina may be used. I prefer alumina itself.

The following examples show a comparison between the catalysts made in accordance with my invention and catalysts made by methods known to the art. Certain obvious modifications of the procedures set forth may be made without departing from the scope and spirit of my invention. The proportions of the catalyst components in the examples and elsewhere herein are given in parts by weight or in weight per cent.

EXAMPLE I.—CATALYST A

*40% $Cr_2O_3$–60% $Al_2O_3$ (phenol digested oxides).*—Chromium trioxide and hydrated alumina were stirred and boiled under total reflux for 67 hours with phenol, equal in amount to twice the weight of the finished catalyst. After digestion the phenol was evaporated and the residue was heated at 750° F. for 21 hours. The catalyst was sieved through a 325-mesh screen, mixed with Sterotex and pilled.

EXAMPLE II.—CATALYST B

*40% $Cr_2O_3$–60% $Al_2O_3$ (thermally decomposed aluminum nitrate and chromium trioxide).*—Aluminum nitrate and chromium trioxide were mixed and heated to 850° F. in about 1 hour and maintained at that temperature for 21 hours. This material was sieved through a 50-mesh sieve, mixed with Sterotex and pilled.

EXAMPLE III.—CATALYST C

*40% $Cr_2O_3$–60% $Al_2O_3$ (alumina gel plus ammonium dichromate).*—Aluminum nitrate and ammonium dichromate were dissolved in distilled water equivalent to 11 times the weight of the finished catalyst, stirred vigorously, and alumina gel was precipitated by the addition of concentrated ammonium hydroxide until a pH of 7.5 was obtained. The thick slurry was dried without filtering at 225° F. for 40 hours. The dry catalyst was heated in small portions to 470° F. and then calcined at 865° F. for 17 hours. This material was mixed with Sterotex, sieved through a 50-mesh sieve, and pilled.

EXAMPLE IV.—CATALYST D

*40% $Cr_2O_3$–60% $Al_2O_3$ (thermally decomposed aluminum nitrate and ammonium dichromate).*—Aluminum nitrate and ammonium dichromate were mixed, heated to 495° F. in 2 hours, heated to 820° F. in about 1 hour, and maintained at that temperature for 18 hours. This material was sieved through a 100-mesh sieve, mixed with Sterotex, and pilled.

The above described catalysts, A, B, C, and D, were compared by utilizing them in the dehydrogenation of technical-grade n-butane under comparable operating conditions. The table compares these catalysts at 80 per cent efficiency, the activities being calculated on the basis of equal weights of catalyst rather than on the basis of equal volumes as is sometimes done. The data of the table also show the deposition of coke on catalysts prepared as stated above. The deposition of coke varies with conversion, so coke formation was calculated on the basis of the butane converted to butene and butadiene. It is to be noted that the catalyst prepared by the method of my invention has less coke formation than do the catalysts prepared by the other methods.

Table

| Catalyst | Activity (weight basis) | Coke, lbs./100 lbs. $C_4$ converted |
|---|---|---|
| A | 33.8 | 6.74 |
| B | 29.9 | 6.92 |
| C | 29.8 | 9.38 |
| D | 20.3 | 10.81 |

From the above data it can be seen that catalyst A, prepared according to the method of my invention, is clearly superior to catalysts B, C, and D, containing the same amounts of chromia and alumina, but prepared by other methods known to the art. An important advantage of catalyst A is its lower apparent density which means that a smaller weight of catalyst is required to fill a given reactor space.

The foregoing samples, when taken in conjunction with the tables, illustrate the superiority of the catalyst manufactured according to the method of my invention. It should be understood that any theories involved or set forth do not in any way limit the invention and that the examples and accompanying data are given by way of illustration of the various advantages of the present invention and are not to be construed as undue limitations thereof. Variations of the invention may be practiced in the light of the disclosure without departing from the spirit or scope of the invention.

I claim:

1. A process for manufacturing a composite metal oxide catalyst which comprises digesting in phenol a mixture of the oxides of aluminum and at least one of the metals selected from the group consisting of Cr, Mo, W, U and V; heating the digested mixture so as to completely dry the same and remove any phenol therein; and forming the resulting oxide composite into suitable particles for contacting operations.

2. A process for manufacturing a composite metal oxide catalyst which comprises digesting in phenol a mixture of the oxides of aluminum and chromium in finely comminuted form; heating the digested mixture so as to completely dry the same and remove any phenol therein; and forming the resulting oxide composite into suitable particles for contacting operations.

3. A process for manufacturing a composite metal oxide catalyst which comprises digesting in phenol a mixture of the oxides of aluminum and chromium in finely comminuted form wherein the chromium amounts to between 10 and 60 weight per cent and the alumina comprises the balance of the catalyst, the amount of phenol being at least one half the weight of the mixed oxides; continuing the digesting for at least 7 hours; heating the digested mixture so as to remove any phenols therein; and comminuting the hardened oxide composite.

4. A process for manufacturing a composite metal oxide catalyst which comprises digesting in phenol a mixture of the oxides of aluminum and chromium for a period of at least 7 hours; heating the digested mixture so as to completely dry the same and remove any phenol therein; and forming the metal oxide composite into suitable particles for contacting operations.

5. The process of claim 4 in which the phenol amounts to at least one-half the weight of the mixed oxides.

6. The process of claim 4 in which the chromium oxide is $Cr_2O_3$.

7. The process of claim 4 in which the chromium oxide is $CrO_3$.

8. The catalyst manufactured by the process of claim 1 consisting essentially of between 10 and 60 per cent by weight of at least one oxide selected from the group consisting of Cr, Mo, W, U and V oxides and the balance aluminum oxide.

9. The catalyst of claim 8 containing chromium oxide.

10. The catalyst of claim 8 containing molybdenum oxide.

11. The catalyst of claim 8 containing tungsten oxide.

12. The catalyst of claim 8 containing uranium oxide.

13. The catalyst of claim 8 containing vanadium oxide.

14. The catalyst manufactured by the process of claim 2 containing chromium oxide in the range of from 10 to 60 per cent by weight and the balance aluminum oxide.

15. A process for dehydrogenating a dehydrogenatable hydrocarbon to produce a less saturated hydrocarbon comprising contacting said dehydrogenatable hydrocarbon under dehydrogenating conditions with a catalyst comprising alumina and at least one metal oxide selected from the group consisting of Cr, Mo, W, U and V oxides manufactured by the process of claim 1.

16. A process of dehydrogenating normal butane comprising contacting said normal butane under dehydrogenating conditions with a catalyst comprising alumina and at least one metal oxide selected from the group consisting of Cr, Mo, W, U and V oxides manufactured by the process of claim 1.

References Cited in the file of this patent

UNITED STATES PATENTS

| | | |
|---|---|---|
| 2,236,679 | Ferguson | Apr. 1, 1941 |
| 2,423,163 | Thomas | July 1, 1947 |
| 2,483,929 | Owen | Oct. 4, 1949 |
| 2,585,033 | Pitzer | Feb. 12, 1952 |
| 2,605,235 | Pitzer | July 29, 1952 |
| 2,606,159 | Owen | Aug. 5, 1952 |
| 2,638,455 | Pitzer | May 12, 1953 |
| 2,664,451 | Owen | Dec. 29, 1953 |